March 13, 1962
C. R. HICKMAN
3,025,073
COLLAPSIBLE FLUID TIGHT TRANSPORT
TANK FOR A VEHICLE BODY
Filed Aug. 17, 1959
3 Sheets-Sheet 3
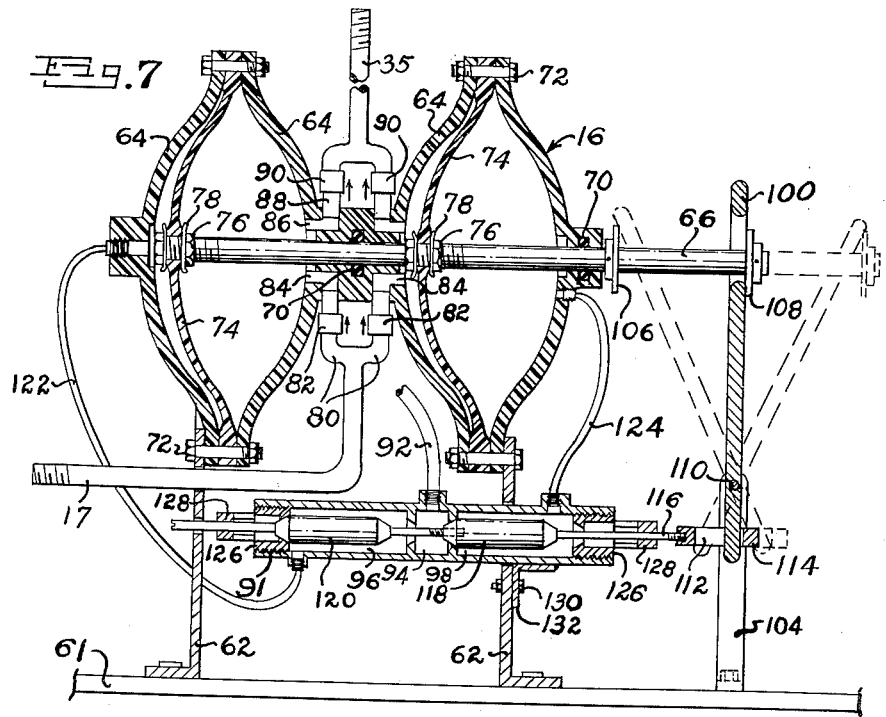
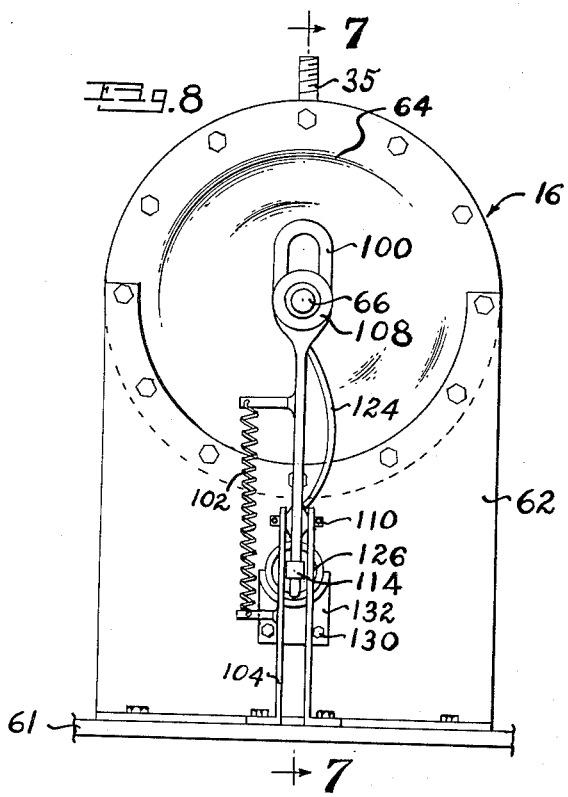
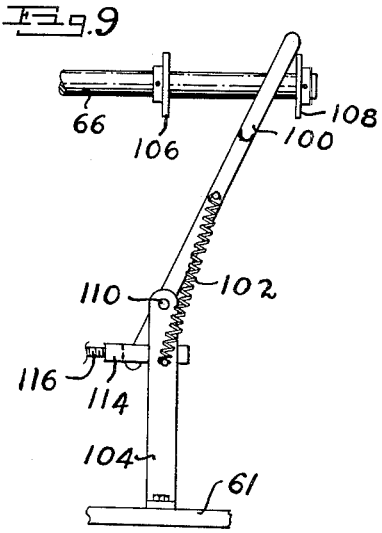
INVENTOR.
CHARLES R. HICKMAN
BY
Wayland D. Keith
HIS AGENT

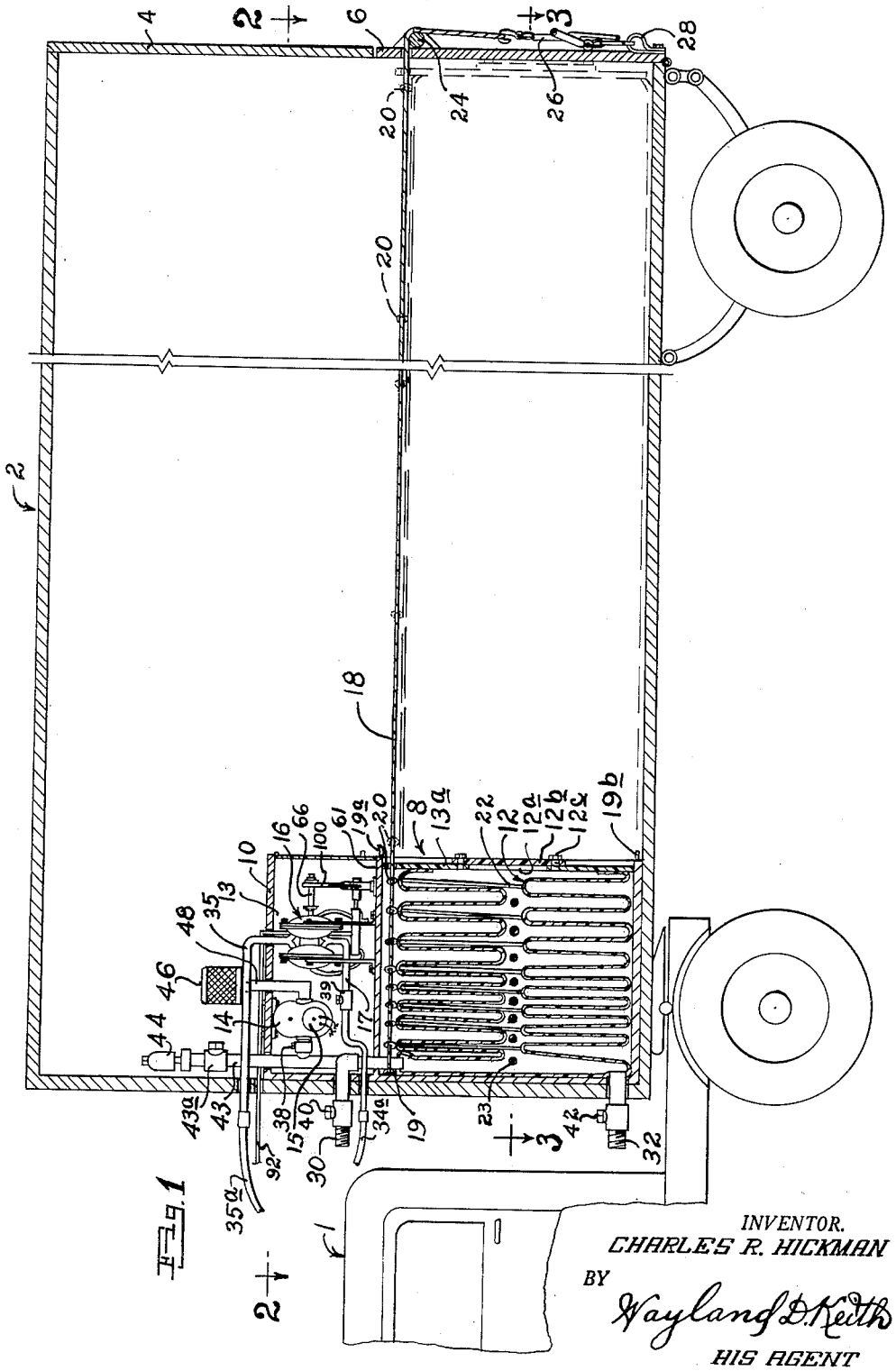

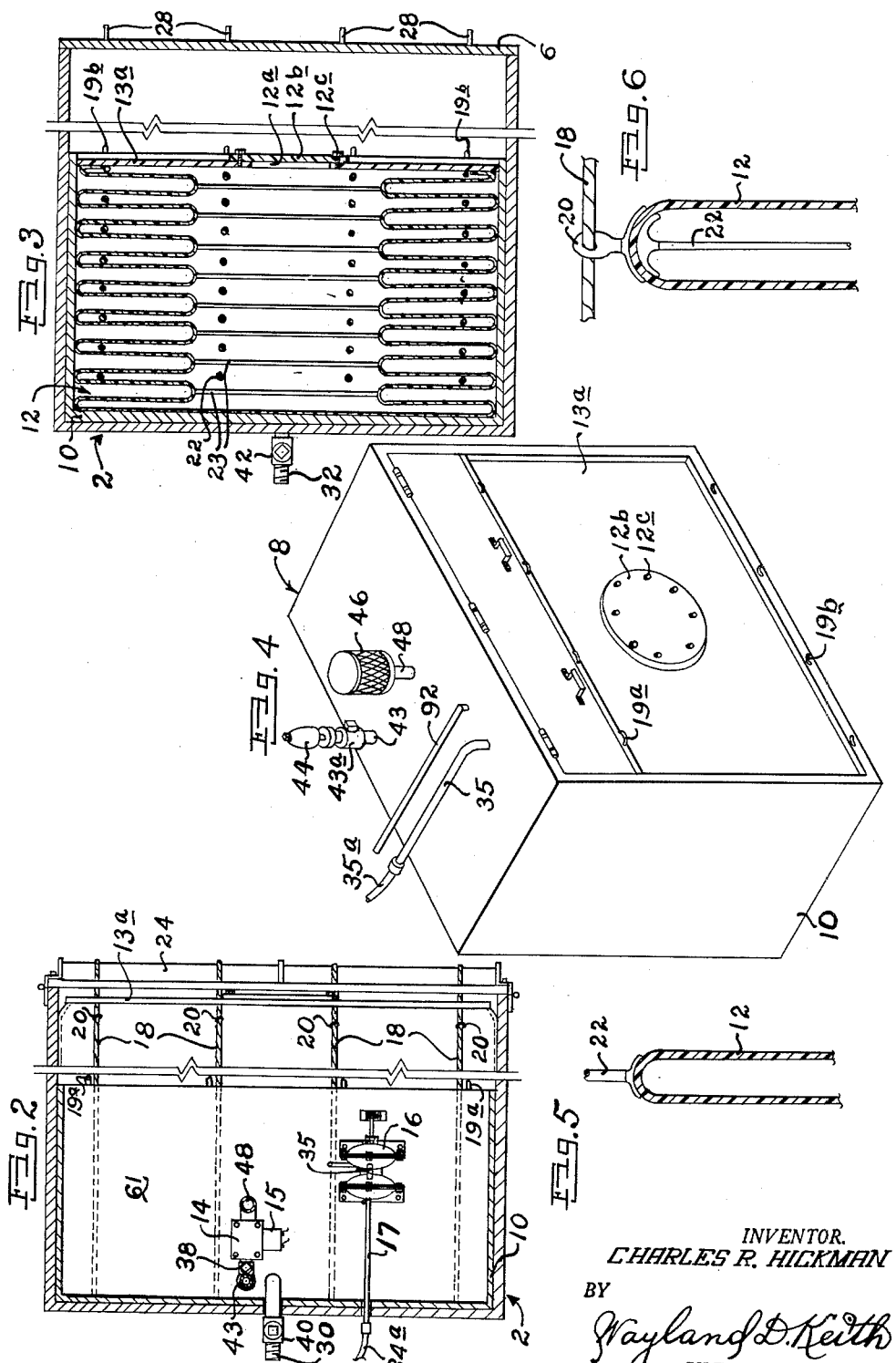

United States Patent Office 3,025,073
Patented Mar. 13, 1962

3,025,073
COLLAPSIBLE FLUID TIGHT TRANSPORT TANK FOR A VEHICLE BODY
Charles R. Hickman, Wichita Falls, Tex., assignor of one-fourth to James E. Parish, Wichita Falls, Tex., and one-fourth to Roy W. Parish, Wichita Falls, Tex.
Filed Aug. 17, 1959, Ser. No. 834,272
2 Claims. (Cl. 280—5)

This invention relates to improvements in tanks for hauling liquids, and more particularly to tanks which may be collapsed when not in use so as to be stored in a relatively small space, but when used, may be expanded to fill the desired size vehicle body, for the transportation of liquids therein.

Various vehicle tanks have been proposed heretofore, but these, for the most part involved the use of a rigid, liquid tight structure, usually of steel or wood, thereby limiting the use of the vehicle, while the tank was fitted thereon, to the hauling of liquids.

The present tank may be constructed of plastic or other light, strong, collapsible material, so that it will occupy a minimum of space when collapsed, but which tank is so designed that it may be collapsed into a protective cabinet to prevent injury to the plastic material, or the like, and which tank may be expanded to fill the lower portion of a vehicle body, which vehicle body need not be liquid tight, but may be of the van type, a grain bed, cattle truck, trailer body, or for lighter more mobile use, to fill the body of the conventional pickup truck.

The present invention is illustrated as being installed in a van type, semi-trailer, whereby the lower portion of the van type trailer body is utilized to retain the expanded tank within the confines thereof, which tank is liquid tight, whereas, the van type trailer or other type vehicle body would not, normally be liquid tight.

An object of this invention is to provide a collapsible tank for vehicle bodies, which tank may be readily expanded to fill a non-liquid tight body, so that the vehicle body may be used to transport liquids.

Still another object of the invention is to provide a collapsible tank, with a pump unit self-contained, which tank and pump unit are self-contained within a cabinet.

Still another object of the invention is to provide a vacuum actuated pump which will positively move liquids into or out of the tank, as desired.

Still another object of the invention is to provide a valve mechanism for a vacuum pump which is simple in construction, easy to operate, and easy to adjust.

Another object of the invention is to provide a composite, collapsible, plastic tank, a pump and blower unit therefor, all of which may be readily adapted to fit a vehicle body which would not normally hold liquids, so as to load, transport, and discharge liquids, the cost of which unit is low as compared with metallic tanks, and the use of which will make possible the dual use of the vehicle, for instance for hauling solids at one lap of a trip and liquids on the return lap.

Still another object of the invention is to provide an arrangement whereby the plastic tank may be expanded or collapsed by a single workman, without undue fatigue on the part of the workman.

With these objects in mind, and others which will become manifest as the description proceeds, reference is to be had to the accompanying drawings, in which like reference characters designate like parts in the several views thereof, in which:

FIG. 1 is a longitudinal sectional view of a vehicle body, with parts broken away and shortened, attached to a tractor, which tractor is shown in elevation, with parts being broken away to bring out the details of construction;

FIG. 2 is a sectional view taken on the line 2—2 of FIG. 1, looking in the direction indicated by the arrows, in which the tank is shown in expanded condition in dashed outline, and with parts being broken away, with parts being shown in section, and parts being shortened, to better bring out the details of construction;

FIG. 3 is a sectional view taken on the line 3—3 of FIG. 1, looking in the direction indicated by the arrows, and showing the tank in collapsed condition;

FIG. 4 is a perspective view of the cabinet containing the tank and the pump and blower units therein, which cabinet is shown apart from the vehicle body;

FIG. 5 is an enlarged, fragmentary, sectional view showing a portion of the tank having an elastomer strip bonded thereto to aid in folding the plastic material of the tank transversely, in an accordion like manner;

FIG. 6 is an enlarged, fragmentary view of a portion of a support cable, a support loop, and a portion of a fold of the plastic material forming the tank, and showing an elastomer strip bonded to the plastic material and depending therefrom;

FIG. 7 is a longitudinal, sectional view of a positive displacement, vacuum actuated pump, taken on the line 7—7 of FIG. 8, looking in the direction indicated by the arrows, and showing the valve switching mechanism of the pump in section;

FIG. 8 is an elevational view of the vacuum actuated pump, for pumping liquids into and out of the plastic tank; and FIG. 9 is a fragmentary detailed, sectional view of the toggle action valve switching mechanism of the pump.

With more detailed reference to the drawing, the numeral 1 designates generally a tractor, such as used for pulling load trailers, which tractor has the usual internal combustion engine therein.

The numeral 2 designates generally a vehicle body, which vehicle body may either by that of a truck, semi-trailer, or full trailer type, and which is of a character that is not generally considered liquid tight, that is, the body is of the general utility type used for general hauling, such as for grain, freight, merchandise, cattle or the like. The vehicle body as shown in FIGS. 1, 2, and 3 is of the van type, which may have doors 4 and 6 which are hinged to the rear portion of the body 2, as will best be seen in FIG. 1.

A tank and pump unit, designated generally at 8 in FIG. 4, is fitted in a cabinet, which cabinet fits into the forward end of hte vehicle body 2, so as to occupy a minimum of space thereby allowing maximum space for hauling other cargo, of dry or bulk type materials, such as grain, boxes of freight, live stock, and the like. This enables the vehicle to be used for a dual purpose, without materially lessening the dry or normal load capacity of the vehicle body, which vehicle body may be readily converted into a "tank truck" for hauling such liquids as molasses, water, acids, and the like cross-country, after the so-called dry load or freight has been transported and delivered, thereby enabling the hauling of pay loads in both directions, regardless of the type of vehicle being used and of the material to be transported.

The cabinet 10 is provided with a lower compartment to contain the collapsed, plastic tank which is designated generally by the numeral 12, and with a pump compartment 13, which contains a blower 14 and a pump 16, which pump is preferably of the vacuum actuated type, which enables filling the plastic tank with liquid cargo and the emptying of the liquid cargo therefrom. The plastic tank 12 may be of plastic film, such as polyethylene or other suitable plastic which will withstand any chemical action thereon by the material being hauled, and which is of sufficient strength to withstand bursting strain, so when the tank is filled with liquid to its expanded capacity, the liquid may be safely transported in a vehicle which is not normally liquid tight.

The plastic tank 12 may be of such size as to fill the lower portion of the vehicle body 2, in which it is used and when fully expanded, without undue stretching, and which tank, when of a size such as used for the body of a pick-up truck, may be folded by hand, to be contained within the cabinet, when it is not in use, however, for tanks to be used in large vehicle bodies, such as in a truck that may be eight feet wide and thirty or more feet long, special support cables 18 are necessary by which to support the tank while it is being expanded or collapsed, to insure greater ease and efficiency in handling and to insure the material of which the tank is made against being torn.

It is preferable to have several cables 18 which extend tightly from the front portion of the cabinet 10 to the rear end gate 6 of the vehicle body, just above the tank 12, which cables 18 pass outward therethrough and over a round beam 24, which is secured to the end gate 6 in position to be on a level with the top of the expanded tank. One end of each cable 18, which pass over the beam 24 is attached to a load tightening device 26, which load tightening device is anchored at 28, to the lower rear portion of the vehicle body 2. It will be seen, that with the cables 18 extending above the plastic tank, and being extended tightly throughout the length of the vehicle body 2, a support for the tank is thus provided.

The tank 12 has loops 20 bonded to the upper side thereof, at spaced intervals, so as to support the tank on cables 18 during the extending movement thereof or the retraction movement. It is preferable to have the outermost loops 20 of such size as to frictionally engage the cable on both the outward and inward movement, particularly on inward movement of the loops 20, so as to retard the movement of the plastic material forming the tank, to allow it to fold properly into a shape that approaches the manner in which an accordion bellows folds into collapsed condition. Elastomer strips 22 are mounted below each of the loops 20 and depend therefrom, and are bonded to the uppermost portion of the bottom of the tank so as to draw the lower portion of the tank upward to form accordion like pleats, due to the contraction of the elastomer strip 22. It is preferable to have the spacing of the loops 20 lineally of the tank such that when the tank is in collapsed condition the accordion pleats thus formed, will be almost half the depth of the extended tank. In this manner it is to be readily seen that the upper and lower folds are so positioned as to occupy the minimum amount of space when the tank is collapsed. Transverse elastomer strips 23, which are similar in construction to the elastomer strips 22, join portions of the tank at each side with the respective opposite portions toward each other so as to form an accordion pleat of the side portions of the tank when being collapsed.

Various methods of filling the tank and of discharging the liquid therefrom may be provided. Normally the load of liquid material may be acquired by connecting an inlet pipe, such as shown at 30, to a source of liquid, if the liquid is at a higher elevation or under sufficient pressure to allow the liquid to flow into the tank. An outlet pipe 32 is provided to be connected to a suitable conduit to enable the ready discharge of the liquid from the tank, if the place of discharge is at a lower elevation than the outlet, or a suction is placed on the outlet pipe 32. However, other conditions may exist which make it necessary for the vehicle driver to load the tank from a point below gravity flow, therefore the use of a pump becomes necessary, which pump is provided in the form of a vacuum actuated pump 16, which, when properly connected to a liquid supply, as by a pipe 17, the liquid may be withdrawn from the supply pipe 17 into the pump 16, and discharge from the pump 16 through pipe 35 into the tank, in a manner that will be more fully explained hereinafter.

Preparatory to filling the tank 12, stopcock 38 is opened and stopcocks 40 and 42 are closed, and with the vacuum-pressure relief valve 44 set to maintain a pressure within the safe working limits of the device, a reversible blower 14 is started in a direction to blow air into the tank 12, which blower is preferably driven by a reversible motor 15 mounted thereon, which motor is connected to a suitable source of electrical energy, such as a battery of the vehicle tractor. An air pipe 48 has an air filter 46 thereon, so when air is being drawn therethrough and discharged into a pipe 43 leading to the top of the plastic tank 12, the air passing into the tank will be filtered. Upon air passing into the plastic tank 12, the plastic tank will expand longitudinally of the vehicle body, as the top of the tank is supported by the longitudinally disposed cables 18, with a rigid head portion of the tank being guided along the cables 18 from the position as shown in full lines in FIG. 1 to that shown in dashed outline therein. As the head 13a moves along the cables 18, the support loops 20 permit the remaining portion of the tank to be supported at spaced intervals so that when the tank is fully expanded, the loops 20 will be spaced apart the lineal distance of the folds of the tank, so that the tank will be in a smooth, taut condition, but not stretched, such as would be the case if an elastomer material, such as rubber, was used. The tank may have longitudinal and transverse spaced apart reinforcing cords of nylon or other fibers to strengthen the walls thereof.

A manhole 12a is provided in the rigid head portion 13a, which manhole is provided with a suitable cover, such as rigid disc 12b which is bolted in place by bolts 12c. The plastic material of the tank is bonded to the rigid head 13a in such manner as to form a secure seal therebetween. The inner end of the plastic tank is preferably made in the form of a large sack, the extreme outer end portion of which is cemented to the innermost side of the cabinet 10. The cables 18 are anchored to loops 19 in the inner portion of cabinet 10 in such manner that when the tank is collapsed, the cable may be laced back and forth over projections 19a and 19b so as to retain the rigid head 13a in place, thereby protecting the flexible material, from which the tank is made, against injury from sharp objects that may be hauled in the vehicle body when the tank is not in use.

It is to be pointed out that, as the tank 12 is expanded by air being forced thereinto by blower 14, it will move along cables 18, in a suspended condition, to fill the entire length of the vehicle body 2, until the rigid head 13a abuts with the end gate 6. With the tank fully inflated in this manner, the liquid is loaded thereinto through pipe 30. The pipe 30 discharges the liquid into the top of the tank 12, and as the liquid fills the tank, the air therein escapes through pipe 43, through vacuum-release valve 44, which is set to retain sufficient pressure on the plastic tank so that the tank will hold its shape, but which pressure is not sufficient to put undue strain on the tank. With the tank loaded, the liquid will occupy a depth to the extent of the depth of the tank and the width and length of the vehicle body. Therefore, a volume of liquid can be hauled to the carrying capacity of the vehicle, without material changes in the conventional freight vehicle equipment.

When it is desired to empty the tank, the valve 42 is opened to allow the liquid to be drained therefrom by gravity, or the pipe 17 of the pump 16 may be connected thereto by a suitable hose 34a and the liquid may be discharged out through pipe 35 and through hose 35a, as will be more fully described hereinafter.

As liquid is withdrawn from the tank, air will flow in through vacuum-relief valve 44 so as not to materially retard the discharge of liquid, or cause undue collapsing of the tank 12, until it is desired to have the collapsing take place. After the tank has been emptied of liquid, the stopcock 38 may be opened, and stopcocks 40, 42 and 43a closed, and the electric motor to run in the reverse direction, so as to exhaust air from tank 12, by use of the reversible blower 14. In this manner, the tank can be readily collapsed into the compartment of cabinet 10, and since the outermost loop 20 will cause greater friction on cables 18 than the other loops 20, the tank 12 will be collapsed in an orderly, accordion-like manner by elastomer strips 22 and 23, as will best be seen in FIGS. 1 and 3. With the tank collapsed in this condition, it is ready for interlacing of cables 18 around projections 19a and 19b, to maintain the rigid head 13a in compartment 10, which will hold the tank 12 in collapsed condition.

Vacuum Actuated Pump Mechanism

The loading of the tank 12 with liquid, when the liquid supply is below the tank, presents a problem, as does the unloading of the tank when the storage receiver is at a higher level or elevation than the tank. To overcome such conditions, a pump has been provided, which is shown in detail in FIGS. 7 through 9, and its application to the present device, to overcome the problems presented, is incorporated into the present application.

The pump, which is generally designated at 16, has a fluid inlet line 17 and a fluid discharge line 35, either of which lines may be connected to either the inlet pipe 30 or the outlet pipe 32 of the tank 12, to enable the filling or the emptying thereof.

The pump 16 is shown to be mounted on a base 61 by means of brackets 62 which extend between the base 61 and the diaphragm housings 64 of the pump. The diaphragm housings 64 are of conventional shape, but it is preferable to have these diaphragm housings made of non-corrosive material, such as plastic or non-corrosive metal, especially when being used for the pumping of liquids which are highly corrosive, such as acids, alkalies, and the like.

The housings 64 are substantially identical in shape, except a plunger rod 66 extends outward through one end of one of the housings 64, and has a sealing element 70 therein, which surrounds the plunger rod 66 in sealing relation. The diaphragm housing members 64 are bolted together by bolts 72, which housings are held in binding, sealing relation with the periphery of the respective diaphragms 74. These diaphragms may be made of suitable diaphragm material, such as plastic, elastomer material or the like. The center of each diaphragm is apertured to receive the plunger rod 66 therethrough.

Nuts and washers 76 and 78 are provided on a side of each diaphragm 74 so as to form a tight seal therewith, thereby dividing each of the housings 64 into separate compartments, one for the passage of liquid therethrough and the other for a reaction by vacuum to actuate the diaphragm 74 back and forth to cause the pumping of the liquid therethrough. The pipe 17 has a branch connection 80 thereon, the branches of which extend into the separate compartments of housings 64. Check valves 82 are provided in each of the branch conduits 80, which check valves admit passage of liquid into the diaphragm housing 64, but prevent the return thereof into inlet pipe 17. The liquid passes from branch pipe 80 out through inlet ports 84 into the respective housings 64, and when the diaphragm moves alternately from the position as shown in FIG. 7, to a position on the opposite side of the housing 64, the liquid is discharged alternately through ports 86 into branch passages 88, thence through check valves 90 into discharge pipe 35.

The movement of the diaphragms 74 back and forth is caused by applying vacuum to conduit 92 which connects with a chamber 94, which chamber 94 is intermediate valve chambers 96 and 98. As the vacuum exhausts the air from one of the chambers on one side of the diaphragm housing 64, the plunger 66 is drawn to that side of the chamber in the housing 64, and as it approaches the side, a valve lever 100 is moved over "dead center" and a toggle action spring 102, which is connected to the lever at one end and to an upstanding bracket 104, which is mounted on base 61, at the opposite end, will cause the lever to move from the position shown in full outline to that shown in dash outline in FIG. 7, and vice versa, upon actuator discs 106 and 108 engaging opposite sides of the lever 100. The lever 100 is pivoted about a pin 110, which pin passes therethrough and through upstanding bracket 104. The lever 100 extends downward and engages a slot 112 in clevis 114, which clevis is mounted on valve stem 116. The slot 112 permits limited movement of valve stem 116 which carries double acting three-way valves 18. The valve stem 116 extends axially of the valves 118 and 120 so as to alternately direct the valves from one seating engagement to another seating engagement, which alternately directs vacuum to conduits 122 and 124 which are connected to the respective housings 64.

The valve housing 91, which is mounted on one of the brackets 62, has a screw threaded seat 126 at each end thereof, on each of which seats an outwardly extending guide 128 is secured, which guides have axially aligned apertures formed therein so as to maintain the valve stem 116 in aligned relation with respect to the housing 91 and the respective valve seats therein. The valve housing 91 is preferably mounted on one of the upstanding brackets 62, as by a bolt 130 which passes through upstanding bracket 62 and a mounting bracket 132 which is secured to housing 91.

It will be readily seen that the valve members 118 and 120 may be removed from the housing 91 by the removal of valve seats 126 and separating the valves 118 and 120, as by unscrewing the valve stem 116 from the adjacent member. However, other methods of securing the valve members to the valve rod may be employed, such as the use of screws.

It is preferable to have the valve lever 100 apertured, as shown in FIGS. 7 and 8, so that the diaphragm plunger rod 66 will pass therethrough, and the actuator discs 106 and 108 may be attached thereto, as by the use of set screws or the like.

It is to be pointed out that the present pump is a positive displacement pump, with no possibility of liquid getting into the vacuum line and ruining the internal combustion engine, or of fumes being withdrawn from the liquid being pumped and passing into the engine, fumes that might occur when acid or other corrosive material is being pumped, and which would cause damage to the motor.

While the collapsible plastic tank and the pump for pumping liquid thereinto and therefrom have been described and illustrated in some detail, it is to be understood that changes may be made in the minor details of construction and adaptations may be made to different installations without departing from the spirit of the invention or the scope of the appended claims.

Having thus clearly shown and described the invention what is claimed as new and desired to be secured by Letters Patent is:

1. A collapsible vehicle transport tank for hauling liquids in a normally non-liquid tight vehicle body, which tank comprises rigid, rectangular end members of substantially the width of the inner width of said vehicle body, and which end members are of a predetermined height, two lengths of flexible, plastic sheeting, each being of a length and width of the vehicle body to be occupied by said tank, each of said lengths of said plastic sheeting being joined respectively to the top and bottom edges of said rigid, rectangular end members, two further lengths of flexible, plastic sheeting each being of a length of the vehicle body which the tank is to occupy and of a width equal to the depth the tank is to be, which last mentioned lengths of flexible, plastic sheeting are joined to the respective ends of said respective end members, one of said end members being movable with respect to the other of said end members, said movable end member being liquid tight, the adjacent longitudinal edges of said lengths of flexible plastic being joined together in fluid tight relation to form a substantially rectangular, closed container, said container and said non-movable end member having at least one opening formed therethrough for the passage of fluid therethrough, which tank will fill the lower portion of said vehicle body, when fully extended, and which is adapted to be collapsed in an accordion-like manner to occupy an end portion of said vehicle body when collapsed, flexible cable members extending throughout the length of said vehicle body a spaced distance above the upper-most of said lengths of plastic sheeting, tensioning means mounted on said body at the rear end thereof and being attachably connected thereto for tightening said cables above said plastic sheet, and means movably mounted on said cables and being connected in supported relation to the upper-most of said plastic sheets so as to permit extension and retraction thereof along said cables.

2. A collapsible transport tank for hauling liquids in a normally non-liquid tight vehicle body, which tank comprises a pair of rigid, rectangular end members, which end members are independently mounted in said vehicle body, flexible, plastic sheeting secured to said rigid, rectangular end members in fluid tight relation, which plastic sheeting is secured together to form a closed, rectangular tube extending between said rectangular end members to form a fluid tight closure therebetween, one of said rigid, rectangular end members being fixed in an end of said vehicle body, the other of said end members being movable with respect thereto, said tank having at least one opening formed in said fixed, rectangular end member for passage of fluid therethrough, said rectangular tube being of a size to fill at least the lower portion of said vehicle body and which is of a height equal to the height of said rectangular end members, which rectangular tubular member is adapted to be collapsed in an accordion-like manner so said collapsed rectangular tubular member will occupy a portion on the inner end of said vehicle body, longitudinally arranged cables mounted within said vehicle body which are stretched tightly immediately above the space to be occupied by said tank comprising said tubular member and said end members when in expanded condition, loops secured to said plastic sheeting along the top thereof immediately below said cables, which cables are threaded through said loops, upright elastomer strips of a length less than the height of said end members secured to the top of said sheeting and to the bottom of said sheeting forming said rectangular tubular member, at spaced intervals throughout the length thereof, with the upper ends of the respective elastomer strips being immediately below the respective loops, and horizontal, elastomer strips which extend transversely mediate the height of said tank, which strips are of a length less than the width of said rectangular tubular member.

References Cited in the file of this patent

UNITED STATES PATENTS

| 1,737,929 | Libby | Dec. 3, 1929 |
| 2,643,602 | Martin | June 30, 1953 |
| 2,712,797 | Woehrle et al. | July 12, 1955 |
| 2,856,867 | Dasey | Oct. 21, 1958 |

FOREIGN PATENTS

| 911,407 | France | Mar. 18, 1946 |
| 1,099,946 | France | Mar. 30, 1955 |
| 1,100,852 | France | Apr. 13, 1955 |
| 330,778 | Germany | Dec. 20, 1920 |